United States Patent [19]
Filliatre et al.

[11] Patent Number: 5,790,128
[45] Date of Patent: Aug. 4, 1998

[54] METHOD FOR THE ENCODING OF IMAGE MEMORIES

[75] Inventors: Eric Filliatre, Merignac; Olivier Pernia, Bordeaux, both of France

[73] Assignee: Sextant Avionique, Meudon La Foret, France

[21] Appl. No.: 508,525

[22] Filed: Jul. 28, 1995

[30] Foreign Application Priority Data

Aug. 19, 1994 [FR] France .................................. 94 10154

[51] Int. Cl.$^6$ ........................................................ G06T 15/10
[52] U.S. Cl. ........................ 345/421; 345/431; 345/514; 345/443; 345/432
[58] Field of Search .............................. 395/121, 131.2, 395/514, 143

[56] References Cited

U.S. PATENT DOCUMENTS

| | | | |
|---|---|---|---|
| 4,484,189 | 11/1984 | Dettmer | 345/133 |
| 4,897,805 | 1/1990 | Wang | 364/525 |
| 5,253,335 | 10/1993 | Mochizuki et al. | 395/122 |
| 5,317,679 | 5/1994 | Ueda et al. | 395/132 |
| 5,339,386 | 8/1994 | Sodenberg et al. | 395/122 |
| 5,386,509 | 1/1995 | Suzuki et al. | 395/523 |
| 5,461,703 | 10/1995 | Goyins et al. | 395/109 |
| 5,475,507 | 12/1995 | Suzuki et al. | 358/500 |

FOREIGN PATENT DOCUMENTS 0 073 338  3/1983  European Pat. Off. .

OTHER PUBLICATIONS

IBM Journal of Research and Development, vol. 26, No. 6, "An Improved Segmentation and Coding Algorithm for Binary and Nonbinary Images", Danielsson, Nov. 1982, USA, pp. 698–707.

Computer Graphics, vol. 15, No. 3, "Contour Filling in Raster Graphics", Pavlidis, Dallas, TX, USA, Aug., 1981, pp. 29–36.

*Primary Examiner*—Phu K. Nguyen
*Assistant Examiner*—Jennifer C. Chen
*Attorney, Agent, or Firm*—Oblon, Spivak, McClelland, Maier & Neustadt, P.C.

[57] ABSTRACT

A method for encoding of words of an image memory designed to be read periodically to refresh an image formed on the screen by set of pixels wherein the image includes surfaces having a uniform color and demarcated by a contour having a median line and the neighborhood of the median line including, on either side of this line, the pixels neighboring a pixel of the median line. The image further contains filar plotting features with one pixel of the screen being in a one to one correspondence with the memory cell containing a word and the reading of the current cell including at least a part of the information needed to write the corresponding pixel on the screen. The method involves recoding memory words in relation to the contours including not only the memory words related to the median lines of the contours but also the memory words related to the neighborhood of the contour. The code of each re-coded memory word includes two information bits concerning the circumstances of the writing of the recoded bits. These two bits enable the identification by the combination of four different possible values.

20 Claims, 8 Drawing Sheets

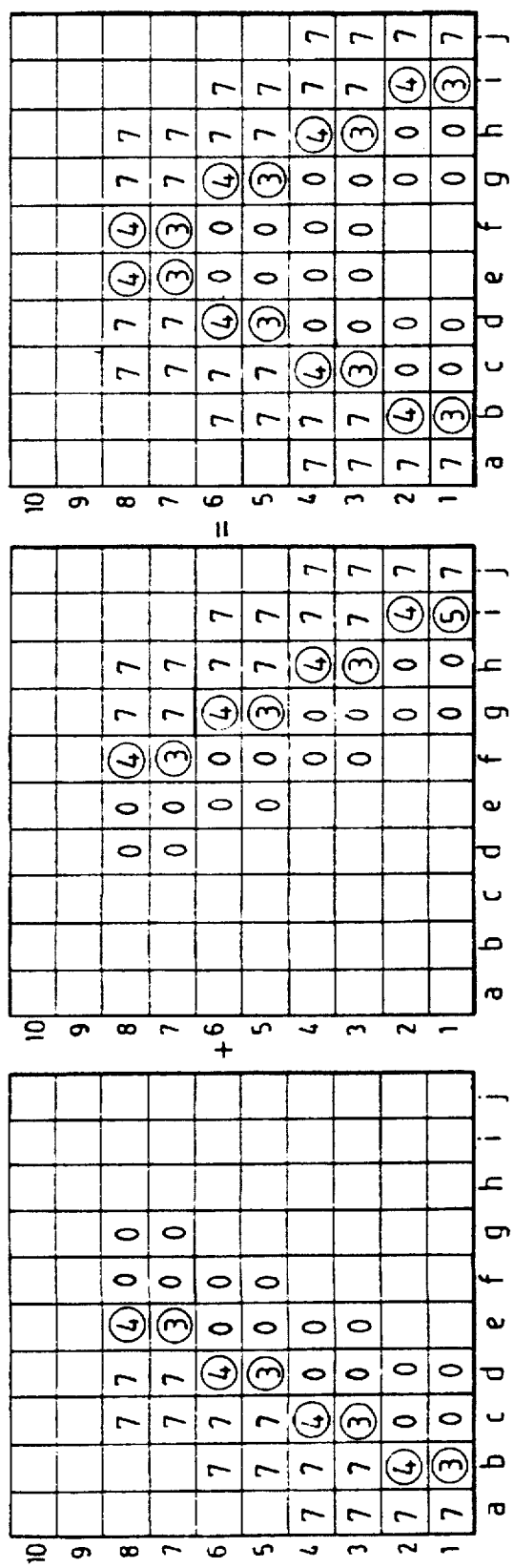

FIG. 10

|  |  | a | b | c | d | e | f | g | h | i | j |  |  |   |
|---|---|---|---|---|---|---|---|---|---|---|---|---|---|---|
|  |  |   |   |   |   |   |   |   |   |   |   |   |   | 9 |
| GRAZING ⇒ |  |   |   |   | 0 | 0 | 3 | 3 | 0 | 0 |   |   |   | 8 |
| GRAZING ⇒ |  |   |   |   | 0 | 0 | 4 | 4 | 0 | 0 |   |   |   | 7 |
| GRAZING ⇒ |  |   |   | 0 | 0 | 3 | 7 | 7 | 3 | 0 | 0 |   |   | 6 |
| GRAZING ⇒ |  |   |   | 0 | 0 | 4 | 7 | 7 | 4 | 0 | 0 |   |   | 5 |
| ENTRY-EXIT ⇒ |  |   | 0 | 0 | 3 | 7 | 7 | 7 | 7 | 3 | 0 | 0 |   | 4 |
| ENTRY-EXIT ⇒ |  |   | 0 | 0 | 4 | 7 | 7 | 7 | 7 | 4 | 0 | 0 |   | 3 |
| ENTRY-EXIT ⇒ | 0 | 0 | 3 | 7 | 7 |   |   | 7 | 7 | 3 | 0 | 0 |   | 2 |
| ENTRY-EXIT ⇒ | 0 | 0 | 4 | 7 | 7 |   |   | 7 | 7 | 4 | 0 | 0 |   | 1 |

FIG. 11

|  |  | a | b | c | d | e | f | g | h | i | j |  |  |   |
|---|---|---|---|---|---|---|---|---|---|---|---|---|---|---|
|  |  |   |   |   |   |   |   |   |   |   |   |   |   | 9 |
| GRAZING ⇒ |  |   |   |   | 7 | 7 | 4 | 4 | 7 | 7 |   |   |   | 8 |
| GRAZING ⇒ |  |   |   |   | 7 | 7 | 3 | 3 | 7 | 7 |   |   |   | 7 |
| GRAZING ⇒ |  |   |   | 7 | 7 | 4 | 0 | 0 | 4 | 7 | 7 |   |   | 6 |
| GRAZING ⇒ |  |   |   | 7 | 7 | 3 | 0 | 0 | 3 | 7 | 7 |   |   | 5 |
| ENTRY-EXIT ⇒ |  |   | 7 | 7 | 4 | 0 | 0 | 0 | 0 | 4 | 7 | 7 |   | 4 |
| ENTRY-EXIT ⇒ |  |   | 7 | 7 | 3 | 0 | 0 | 0 | 0 | 3 | 7 | 7 |   | 3 |
| ENTRY-EXIT ⇒ |  | 7 | 7 | 4 | 0 | 0 |   |   | 0 | 0 | 4 | 7 | 7 | 2 |
| ENTRY-EXIT ⇒ |  | 7 | 7 | 3 | 0 | 0 |   |   | 0 | 0 | 3 | 7 | 7 | 1 |

METHOD FOR THE ENCODING OF IMAGE MEMORIES

BACKGROUND OF THE INVENTION

The invention relates to a method of encoding for the real-time writing and reading of memories used for the refreshing of images on screens, for example matrix structure screens where each of the pixels of the screen is defined by its address and its luminosity.

In known devices that carry out writing and reading functions, the memory has at least as many cells as the screen has pixels. The structure of this memory reflects that of the screen and a direct correspondence may be established between the elementary cell for the memory and the pixel for the screen. A cell of the memory has information elements enabling a pixel of the screen to be defined.

The regular and permanent reading of the memory, so as to enable a renewal of the image of the screen, at a rate for example of 50 images per second, does not raise any particular problems. However, the writing in the memory and the renewal of the information elements contained in the memory has a duration that is related to the complexity of the image to be represented. It is difficult to contain this duration within a period of time limited to the image refreshing period. In particular, the drawing or plotting of the surfaces greatly affects the time needed to prepare the drawing or plotting.

Hereinafter, both for the prior art and for the invention, it is assumed that an image of the screen may be defined by a set of surfaces standing out against a background, each surface having a contour, the contour demarcating a part external to the surface and a part internal to it. The surface may also include filar elements. These are longilinear surfaces for which the local transversal dimension is limited to a few pixels.

Such a screen with a simple image meeting the criteria that have just been stated is shown in FIG. 1. This image has a background 1 against which there stand out two surfaces 2 and 3 and one filar element 4. The surfaces 2 and 3 are demarcated by their respective contours 5 and 6.

Such an image corresponds to a simplified form of depiction of an artificial horizon. The surface 3 represents the earth, the surface 2 the sky, the filar element 4 between the two surfaces represents the line of the horizon as a function of the maneuvers of an aircraft on which the artificial horizon is mounted. In this simple case, the surfaces 2 and 3 and their respective contours 5 and 6 exist but their shapes and surfaces may vary. In the general example pertaining to the invention, the same will be true. There will be at least locally, for example on a horizontal band of the screen, a fixed number of surfaces to each of which a contour is assigned. A surface may possibly be temporarily zero. The image may also include filar plotted features at any positions. These filar plotted features would correspond, for example, to graduations or to alphanumeric recordings or to silhouettes.

Among the known methods used to fill the cells of the memory with plotted features or drawings, a first approach consists in scanning an envelope external to a surface to be drawn. Such an external envelope is depicted for the surface 2 by a contour 7 such as the one shown in dashes. The cells that are on the pixels which together define the contour 6 of the surface 2 are then filled. Then, the scanning of the memory is limited to the surface within the contour 7. During this scanning, which is for example a horizontal scanning limited by the contour 7, a prior reading of the scanned cells is used to identify the crossing of the contour 7 and within each of the cells that are inside the contour 7, a recording is made of the luminosity, color or grey level chosen for the surface 2. In this type of technique, the contour 6 of the surface 2 is generally sub-divided into half-contours. This is valid only for convex contour shapes. This point is often verified for surfaces with simple shapes. In the case of a horizontal scanning, the left-hand half-contour and the right-hand half-contour are considered. These contours are not recorded in a memory image but generally in additional memories called mask memories. This mechanism enables a far simpler management of the contours and prevents any conflict with the contents of the image memory.

Such a method is used to limit the drawing or plotting time, for each of the surfaces, to the time needed to scan the surface located within the contour 7 which is a simple contour that will have been chosen to be as close as possible to the contour 6. The contour 7 demarcating the scanning zone is often the smallest rectangle in which the contour 6 can be recorded. The time used to make the surface 2 increases however linearly with the surface 2.

A second known approach consists in using an additional image memory for each of the different surfaces that have been catalogued. This memory is encoded on one bit at the value 0 or 1. It has one value, for example a value of 0 for a position outside or inside the surface and 1 for a pixel crossing the contour of the surface. The image memory and the additional memories are re-read in parallel. One embodiment of an image memory and of the additional memories associated with each surface may take the shape shown in FIG. 2. FIG. 2 shows a part of the image memory used for the renewal of an image such as the one shown in FIG. 1. Each of the cells 8 of this memory may contain an information element, for example on 8 bits, used to define the color of the pixel. A possible depiction of a memory word of a cell 8 is shown in FIG. 3. It has been assumed that the word comprises 16 bits. The eight most significant bits represent, for example, the luminosity. The eight least significant bits may be used to indicate a crossing of a surface. It is thus possible to work on eight different contours of surfaces. With this convention, the pixels defining the contour of the surface No. 3 are defined by the fact that the bit No. 3, with the bits being numbered for example from the right, is at 1. Each contour and its color is thus entirely defined.

During the scanning of the memory for the drawing or plotting of the image of the screen, the crossing of the contour of the surface 3 is detected by the detection of the value at 1 of the third bit. For the scanning of the current line, this will activate, starting from this pixel, the display of the color assigned to the surface No. 3 until a value 1 is retrieved for the value of the bit No. 3. This will indicate the fact that the surface No. 3 is being left.

This procedure enables the processing of the contour intersection without any particular problems. However it does not enable any processing of complex contours having alternatively concave and convex shapes for it then leads to confusion between the exterior and the interior of the surface. It will be observed that, with such a method, a high level of performance is achieved by considerably reducing the time taken to draw the surfaces. By contrast, a confusion may appear between the interior and exterior of complex-shaped surfaces during the re-reading of the image memory. Furthermore, the capacity of the additional memory that has to be planned for the binary recording of the contour crossings increases linearly with the number of surfaces. This soon gives rise to prohibitive costs and space requirements.

It will then be noted (and this observation is the basis of the invention that shall be described), that the color whose encoding is, in the example shown in FIG. 3, designed for the eight most significant bits is not recorded for the surfaces. It is this non-recording that enables a gain in drawing or plotting time. The color is given at the time of the memory reading for the refreshing of an image of the screen by means of a reading processor. This processor sets up the association, with the first crossing of one of the contours, for example the contour No. 3, detected by the fact that the third bit starting from the right is at the value 1, of the color internal to the contour No. 3. It stops this association at the second crossing of this contour detected in the same way. It is only in the case of filar plotted features which always represent a major part, not of the surface but of its meaning, that the color is indicated on the eight most significant bits. As a result, a major portion of memory is mobilized This portion of memory, except for the filar plotted features, is not used.

SUMMARY OF THE INVENTION

The present invention is aimed firstly at reducing the drawing or plotting time of a memory for the refreshing of an image of a screen and secondly at reducing the size of the memory for one and the same drawing or plotting quality.

In the preferred embodiment, it is aimed at obtaining efficient filar plotted features and efficient processing of the contour intersection on the one hand, and of complex surfaces on the other. It is also aimed at efficient anti-aliasing of transitions between the different surfaces or between the surfaces and the background and between the surfaces and the filar elements.

To these ends the invention uses, as in the second prior art approach described, a method in which the colors corresponding to the filar plotted features are recorded and read in the memory of the plotting. For the surfaces, as in the prior art, it is only the contours of the surfaces that are plotted in the memory. As in the prior art, each contour is assigned an order of priority as is each filar plotted feature. First of all, the contours are plotted by rising order of priority and then the filar plotted features, also by rising order of priority. This plotting order makes it possible, in the event of the superimposition of two or more plotted features going through one and the same pixel, to replace the information elements, for this pixel, that are contained therein with the information elements to which the greatest importance is attached.

However, according to the invention, for each memory word, two bits will be used. These two bits will hereinafter be called case identification bits. These two bits can be used to set up four combinations of values. The inventors have observed that there are four cases of plotted features. For three of these cases, the information elements given in the memory differ from one another in their nature. For the fourth one, the information elements are the same as in one of the other three cases but the code of this fourth case makes it possible, as shall be seen further below, to ascertain that the operation is in a contour intersection zone that has already been processed. The reprocessing is therefore not permitted owing to the risk of wrong interpretation. The two bits that define the cases of the plotting are used by the reading processor of the memory to find out if the current pixel or the pixel following the color information element must be read in the memory or, on the contrary, in a memory internal to the reading processor.

The four cases identified by the identification bits shall now be explained.

Should the contour plotting involved be that of a surface with neither intersection nor crossing, the code 01 for example will be used in writing in the memory. Whenever this code is encountered at the location reserved for the identification code of cases in the memory cell, it will be known that the operation is at a contour pixel or a pixel that is a neighbor of a contour and that this contour, at this position, has no intersection with another contour or with a filar element. Thus, for example, all the pixels of the first plotted contour will be at the identification code 01. If the second plotted contour has no point of intersection with the first one, the memory cells corresponding to the pixels of each of these two contours and their neighborhoods will keep the identification code 01.

If the i order contour intersects a j order contour ($j \leq i$), it means that there are pixels and neighborhoods of pixels common to the two contours i and j. This fact will be detected because, during the plotting of a contour, before the filling of the memory cell, the reading of this memory cell is carried out methodically. It may be recalled at this stage that, as in the prior art, the image memory is reset at 0 after each end of the reading of the memory. The start of the plotting is therefore done each time on a blank memory. It is also specified that the plotting of the different contours is done successively, the contour plottings with the highest priority being done last. The filar plotted features are made similarly after the plotting of contours and by rising order of priority, the filar plotted features with the greatest priority being made last.

If, at the time of the plotting of the contour i, an already loaded memory cell is detected, a reading will be activated of the cells on the current scanning line and on the line neighboring this already loaded cell. This will enable the detection, in this neighborhood, of the pixels already used for the description of the contour j. All the memory cells of this neighborhood will be assigned the code 10. The information elements contained in the memory cells playing a part in the definition of both the contours i and j will be replaced by information elements on the contour i since this contour has priority over the contour j. At the same time as they are overwritten by new information elements, the identification code will be reset at 0. For the memory cells playing a part in the definition of the median line of the contour j, a bit value, for example at 1, will be recorded on a bit of the memory cell dedicated for this purpose if the reading signifies that the contour j has been crossed. The memory cells whose code remains at 0 are therefore those that have been re-read during the plotting i but whose information elements have not been changed. If this cell is on a new contour or on a new subsequently plotted filar feature, the code 10 will indicate that the local sequence of luminosity values has already been processed and possibly overwritten by a following plotting. This information element therefore no longer constitutes a coherent whole, and its reprocessing is not permitted owing to the risk of wrong interpretation. In other words, the sequential information on the crossing of the contour recorded during the plotting of the contour j is no longer integrated into these pixels and should no longer be decoded.

The case identification codes that indicate a fact of belonging to a filar element are 00 and 11.

The code 00 indicates that the pixel corresponding to a memory cell having an identification code at this value is only present on a surface or on a background. The detection of this code in the reading of the memory will interrupt an order of automatic assignment of a color to a surface and will replace it with a color whose value will be read on bits assigned for this purpose in the memory cell.

The code 11 will indicate the fact that the pixel corresponding to a memory cell having a code of identification with this value is on a contour. This case will be detected by the methodical reading of the memory before writing. In this case, the procedure will be the same as for the already described intersection of two contours. A part of the memory cell is reassigned for the writing therein of the contour crossing information. In doing this, a part of the memory is occupied that is normally devoted, for an identification code of a filar plotted feature, to the recording of a color. In this case, and in this case alone, owing to the smaller space available in the memory, the color will be recorded in downgraded mode, namely on a reduced number of bits. The tests performed by the Applicant have shown that the quality of the image is not thereby affected.

In short, the invention relates to a method for the encoding of the words of an image memory designed to be read periodically to refresh an image formed on a screen by a set of pixels, the image comprising surfaces $S_1, \ldots, S_2, \ldots, S_p$ that stand out against an image background, each of these surfaces having a uniform color and being demarcated by a contour $C_1, \ldots, C_2, \ldots, C_p$, each contour comprising a median line joining the pixels located at the boundary of at least two surfaces or of a surface and the background, and a neighborhood of the median line comprising, on either side of the median line, at least the pixels that immediately neighbor a pixel of the median line, the image further containing filar plotted features, one pixel of the screen being in a one-to-one correspondence with a memory cell that may contain a word and the reading of the current cell constituting at least a part of the information needed to write the corresponding pixel on the screen, a method in which the image memory is erased after each reading and in which an order of priority is assigned firstly to the contours and secondly to the filar plotted features, the contours being recorded first of all, and then the filar plotted features and for each of these types of plotted features by rising order of priority, the plotted features with the greatest priority being recorded last, wherein the memory words re-coded in relation to the contours include not only the memory words relating to the median lines of the contours but also the memory words relating to the neighborhood of each contour and wherein the code of each re-coded memory word comprises two information bits to identify the circumstances of writing of the re-coded a bits. These two bits enable the identification, by the combinations of their different possible values, of four cases:

the first case, identified by a first combination of values of the two bits, identifies a filar plotted feature which, for the pixels shown, is not on the plotting of a previously written contour;

the second case, identified by a second combination of the value of the two bits, identifies a contour plotting which, for the pixel shown, is not on the plotting of another contour;

the third case, identified by a third combination of the value of the two bits, identifies a contour plotting which, for the pixel shown, is in the neighbourhood of a previous contour;

the fourth case, identified by a fourth combination of the value of the two bits, identifies a filar plotting which, for the pixels shown, is common to a previously plotted contour.

BRIEF DESCRIPTION OF THE DRAWINGS

The invention will be understood more clearly and other characteristics will appear from the following description and from the appended drawings, of which:

FIGS. 8A to 8C and 9A to 9C show a part of the pixels of a screen for two types of contour;

FIGS. 10 and 11 illustrate the interpretation on the screen during the reading of sequences comprising to FIGS. 8 and 9.

DESCRIPTION OF THE PREFERRED EMBODIMENT

Figure 1:
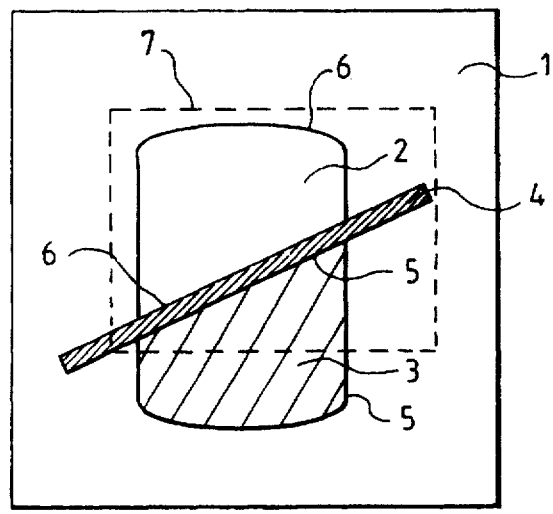
FIG. 1 shows a view of the screen with a single image.
Figure 2:
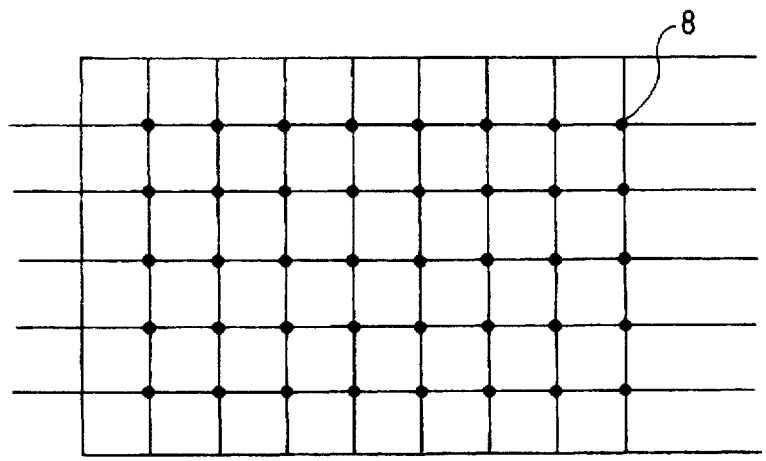
FIGS. 2 and 3 respectively show a very schematic view of an image memory associated with the image of FIG. 1 and a memory word of a cell of this memory.
Figure 3:

FIGS. 1 to 3 have already been described here above with reference to the prior art and shall therefore not be looked at again in this description.

In the preferred embodiment of the invention, a group of bits is also used for the cases pertaining to the first three combinations mentioned here above, this group of bits being designed to mark a transition between two surfaces or a surface and a filar plotting. Before explaining what this variable represents, the relative values that it takes and the use made thereof, it must be recalled that the memory words of an image memory are read in the order in which the screen is scanned. Thus, in the most common case, the scanning is a line-wise scanning, for example a horizontal scanning, and the memory words are read line by line, for example from left to right. A notion of a contour has been introduced further above. This notion comprises not only a median line which strictly speaking represents a line of separation between two surfaces but also a neighboring zone located on either side of the median line. This notion of neighborhood shall now be specified. But first of all, a few points need to be recalled. The image to be shown on the screen is given, for example, by a symbology generator. This generator makes a point-by-point computation of the coordinates of each contour. The joining of these points in a smooth line is the true contour. The points thus computed do not necessarily correspond to the centers of the pixels of the screen. For each of the points of the true contour, it is possible to define the tangent to the contour at this point and the normal to the contour at this point. For this true contour, the neighborhood of the contour strictly speaking is formed by the surface generated by the shifting of a fixed-length segment that is always on the normal to the true contour, the tangent to the true contour being the mediatrix of this segment. On the screen, the only points available to make the image are the pixels. Generally, there are no pixels available aligned along the normal to the contour. In its most general form, the neighborhood on the screen could be defined as being the surface between two lines. The first line is the line joining the pixels closest to the points of one of the ends of the segment having the tangent as its mediatrix and the second line is the line joining the pixels closest to the other end of this segment. The screen scanning lines that determine the order of reading of the pixels may be locally secant or tangent to a contour. Should the scanning line be secant to the contour, two cases may be distinguished. In the first case, the scanned pixels are first of all those located outside the contour, one pixel of the contour, and then the pixels inside the contour. In the second case, the scanned pixels are first of all the pixels within the contour, the pixels of the contour, and then the pixels outside the contour.

The variable of transition has lower values $G_{min}$ for the pixels of the neighborhood outside the surface and higher values $G_{max}$ for the pixels of the neighborhood inside the surface. For the pixels of the median line, the variable of transition has an intermediate value $G_0$ between the highest value of $G_{min}$ and the lowest value of $G_{max}$.

As a result, if the scanning of the memory which, it may be recalled, corresponds, memory word by memory word, to the pixels of the screen, takes place along a secant to the contour, a sequence $G_{min}$ $G_0$ $G_{max}$ will be encountered if the scanning is from the exterior of the contour to the interior. In other words, it will be a sequence of rising values of G. If not, i.e. if the direction taken in the order of scanning goes from the interior to the exterior of the surface, then the sequence will be a sequence of descending values.

The sequencing of the values of the magnitude of transition thus makes it possible to inform the image memory reading processor if there is entry into the surface or an exit therefrom. It will also be noted that a sequence such as $G_{min}$ $G_0$ $G_{min}$ will indicate a scanning line that grazes the contour.

It will be seen further below that, in the preferred embodiment, the intermediate value $G_0$ may indicate a coefficient of colorimetry between the color of the internal pixels and that of the external pixels enabling the making of a gradient and hence the smoothing of the surface.

Figure 4:
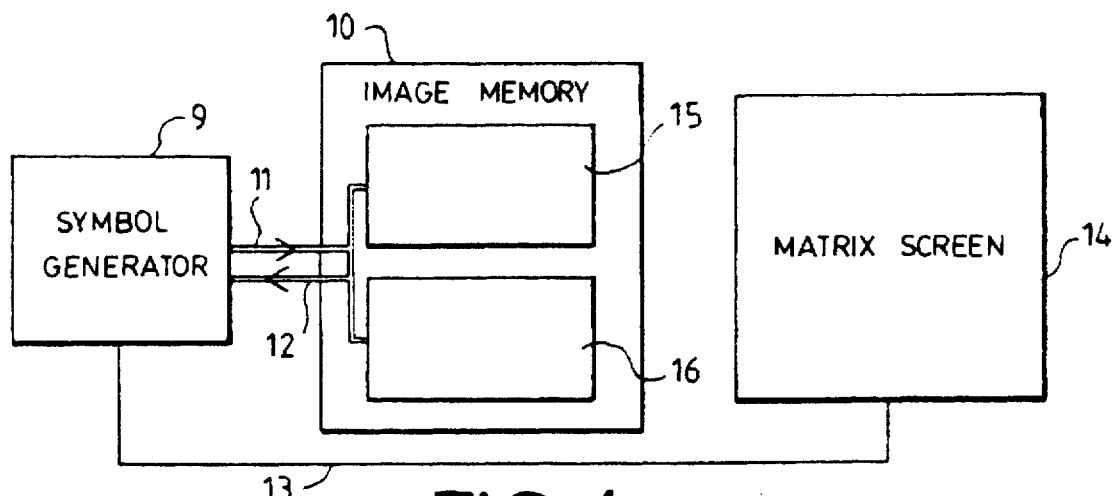
FIG. 4 is a drawing of a graphic processor implementing the invention.

In the preferred embodiment which shall be described, the method according to the invention is designed to encode the memory words of an image memory such as the one shown in FIG. 4. The device shown in FIG. 4 has a symbol generator 9. It is a graphic processor producing signals in digital form to supply an image memory 10 by means of a writing link 11. This same processor is also used to read the image memory 10 by means of a memory-processor link 12. The data elements extracted from this memory are processed and complemented in the processor which supplies the matrix screen 14 by means of a link 13. The memory 10 has two pages that are used alternately, in a manner known per se, to prepare the plotting on one while the other is used to refresh the screen.

The symbol generator 9 first of all produces a flow of points in the form of the following digital information:

a pair of coordinates X, Y;

an angle θ between the tangent to the plotted feature and the local line of the scanning of the screen. In the case of the embodiment, the scanning of the screen is done in a standard way, line by line, the lines being parallel to the axis $\vec{X}$;

color in the form of a triplet red green blue (R G B).

In a second stage, the processor replaces each of the points $T_i$ having coordinates $X_i$, $Y_i$ that are independent of the position of the centers of the pixels by points $P_i$ that occur at the location of a center of a pixel.

For the determining of the points $P_i$, the axis parallel to one of the axes of coordinates of the screen that is closest angularly to the tangent to the plotted feature is called $\vec{T}$. Thus, when the tangent to the plotted feature forms an angle with the horizontal axis $\vec{X}$ lower than or equal to 45°, the axis $\vec{T}$ is parallel to the axis of the $\vec{X}$ points. If not, it is parallel to the axis $\vec{Y}$. Similarly, the axis $\vec{X}$ or $\vec{Y}$ closest angularly to the normal to the plotted feature is called $\vec{N}$.

Figure 5:
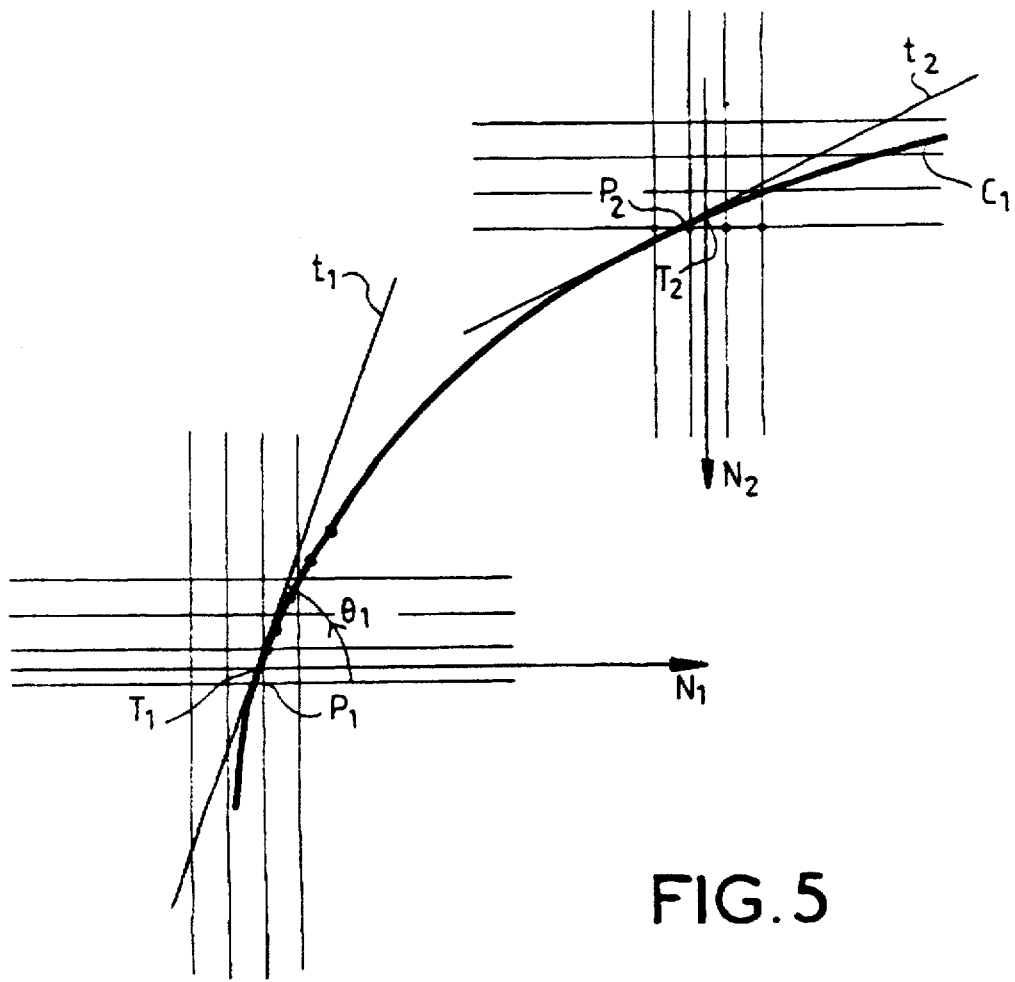
FIGS. 5 to 7 are graphs explaining the invention.

FIG. 5 illustrates what has just been explained for two points $T_1$ and $T_2$ of a plotting of a contour $C_1$. For the point $T_1$, the tangent to the plotted feature forms an angle $\theta_1$ with the horizontal that is greater than 45°. In this case, the axis $\vec{N}_1$ is an axis parallel to the horizontal axis $\vec{X}$. For the point $T_2$, it is the reverse and the normal $N_2$ is, for $T_2$, parallel to the vertical axis Y. The centers of pixels are at the intersections of vertical and horizontal lines forming a grid. This grid has been shown only in the neighborhoods of $T_1$ and $T_2$.

For any point $T_i$, the corresponding point $P_i$ is, according to this embodiment, firstly on the line of the centers of pixels parallel to the axis $N_i$ which is the closest to the point $T_i$ and, on this line, it is the pixel $P_i$ which is the closest to the tangent $t_i$ at the point $T_i$. Thus, for the points $T_1$ and $T_2$ shown in FIG. 5, the extrapolated point of $T_1$ is the point $P_1$ which is firstly on the line of pixels parallel to $N_1$, which in this case is horizontal, that is closest to $T_1$. Secondly, $P_1$ is, on this line of pixels, the pixel closest to the tangent $t_1$ at the point $T_1$ of the contour $C_1$. Similarly, the extrapolated point of $T_2$ is the point $P_2$ which is firstly on the line of pixels parallel to $N_2$ which, in this case, is vertical, that is the closest to $T_2$ and on this line the pixel $P_2$ is the closest to the tangent $t_2$ at the point $P_2$ of the contour $C_1$.

It has been seen further above that, according to the preferred embodiment, a transition coefficient G has been introduced for the surface contours and the filar plotted features not superimposed on a contour. The value of this coefficient at the contour crossing pixel is a function of the position of the center of this pixel $P_i$ with reference to the corresponding point $T_i$, at output of the symbol generator An exemplary determining of $G_0$ with respect to the values $G_{min}$ and $G_{max}$ shall be given with reference to FIGS. 6 and 7.

Figure 6:
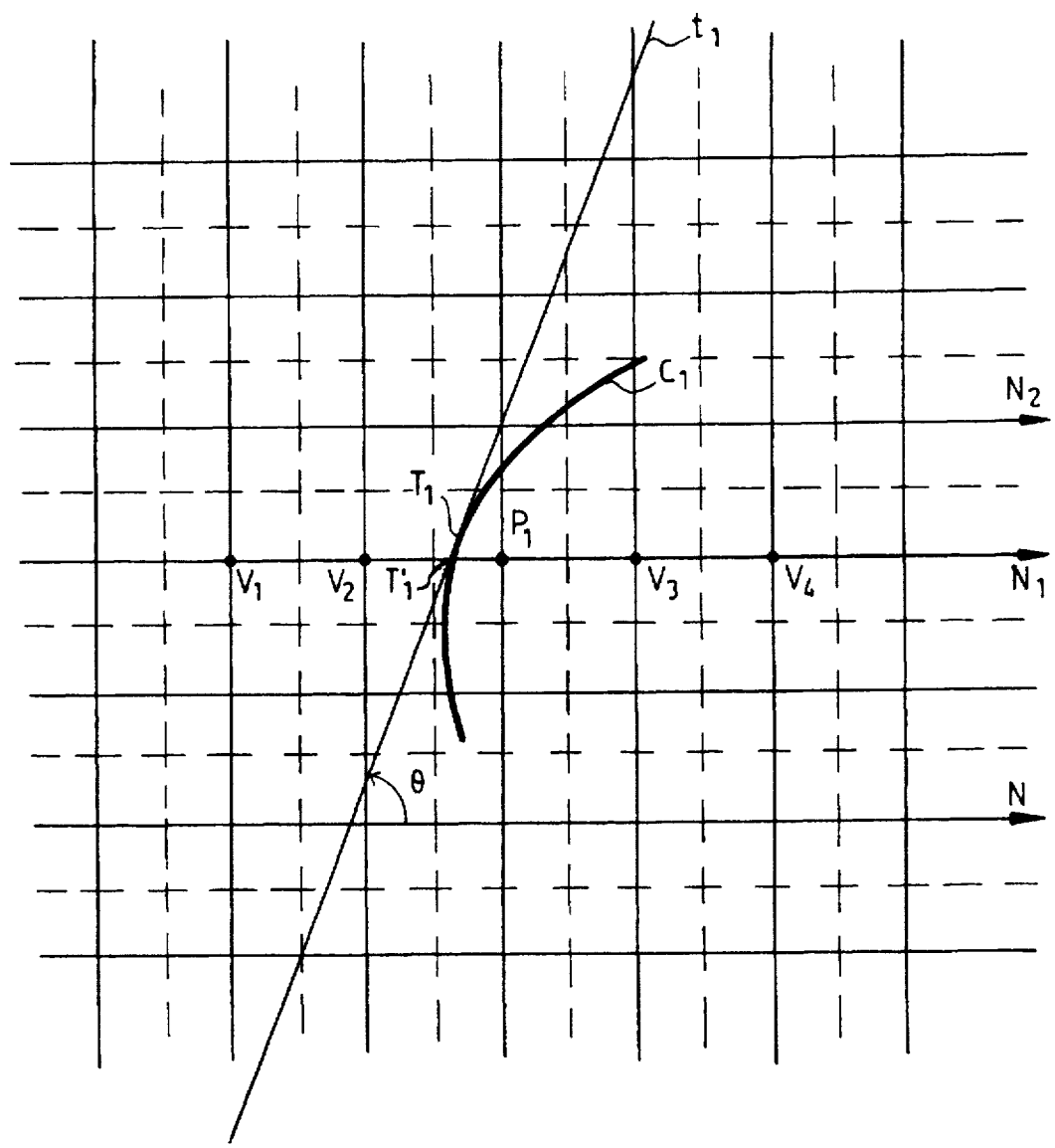

FIG. 6 shows an enlarged detail of FIG. 5: this is the detail at which the point $T_1$ and its corresponding point $P_1$ appear. In FIG. 6, the centers of the pixels of the screen are at the intersection of evenly spaced out horizontal and vertical lines. The surfaces of pixels have been shown by their contours in the form of a squaring of dashed lines. It has been seen in the description of FIG. 5 that, for the point $T_1$ and its tangent $t_1$, the direction N was formed by horizontal lines. The point $P_1$ is the center of the pixel closest to a point $T'_1$ which itself is the point of intersection of the line N closest to $T_1$ with the tangent $t_1$ at the point $T_1$ of the contour $C_1$. In this embodiment, the points located in the neighborhood of $P_1$ are formed by the points $V_3$, $V_4$ and $V_1$, $V_2$ which are on the line $N_1$ of the point $P_1$ closest to $P_1$ and on either side of this point.

The points $V_1$, $V_2$ which are, for example, outside the contour are assigned transition coefficients $G_{min}$ and the points $V_3$, $V_4$ which are inside are assigned transition coefficients $G_{max}$. The point $P_1$ that is on the contour is assigned a coefficient that is an intermediate value between $G_{min}$ and $G_{max}$.

Figure 7:
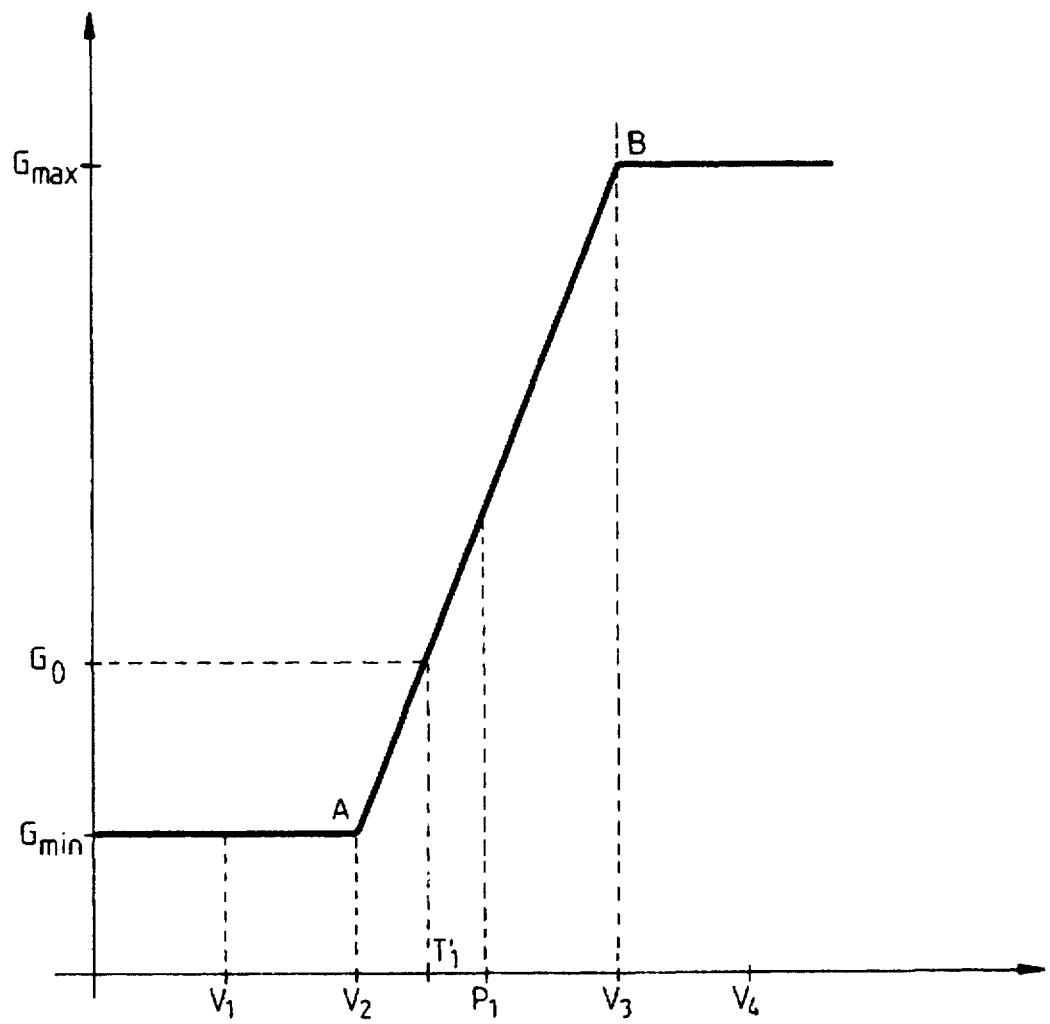
Figure 12A:
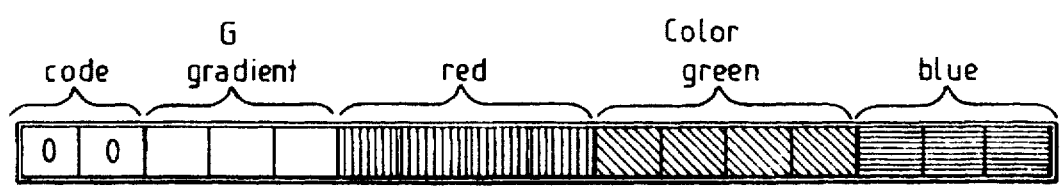
FIGS. 12A to 12D show an exemplary encoding in an embodiment according to the invention.
Figure 12B:
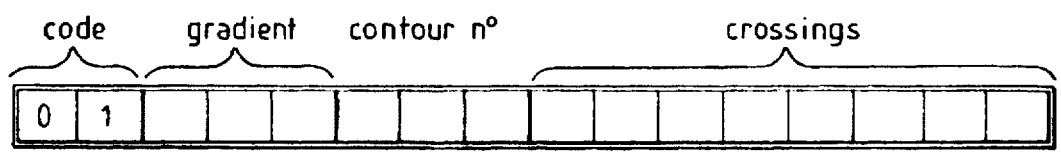
Figure 12C:
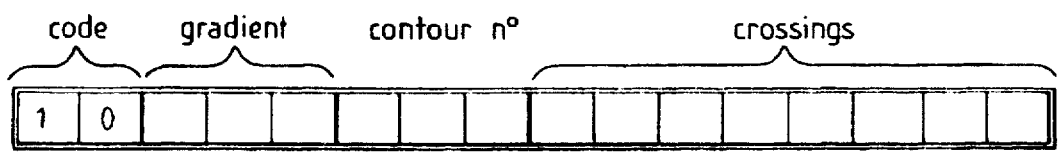
Figure 12D:
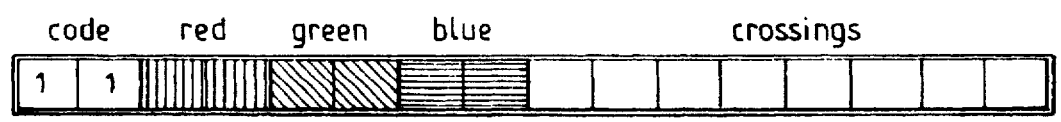

FIG. 7 is an example showing a way to determine the value of $G_0$. It shows a graph on which the values $G_{min}$ and $G_{max}$ are represented on the y-axis and spacings of the points $V_1$ $V_2$, $T'_1$ $P_1$ $V_3$ $V_4$ are shown on the x-axis. On the segment AB joining the y-axis points $V_2$, $G_{min}$, $V_3$, $G_{max}$, the value of $G_0$ is the y-axis value of the x-axis point $T'_1$.

Naturally, it is possible to choose another curve to join the points A and B and thus take account of the real shape of the contour. In general, a Gaussian curve is chosen.

The values of the transition variable associated with each successive point of the contour are recorded gradually in an image memory, in the page assigned to the preparation of the plotting. This page is entirely initialized at 0 before the first writing operation. The successive writing of these values may, depending on the shape of its contour, lead to cases of superimposition of the values G in the image memory. It is therefore necessary to ensure the consistency of the generation of these values and especially to ensure the same final value in every case. This is why, for each pixel address, the value that will be finally recorded in the image memory takes account both of the value $G_0$ of the most recent variable of transition as well as the value $G_r$ that may have been recorded in a prior phase of the plotting of the contour, this value being obtained by a methodical reading done before every writing operation and being designed specifically to detect a prior recording.

Some simple rules govern the computation of the final value that shall be recorded in the image memory. For this computation, an additional information element is needed. The interior of this surface has to be positioned with respect to the curvature of the contour. It will be said that the contour is concave if the center of curvature is located within the surface. If not, it will be said to be convex. With this terminology:

For a concave contour, the final recorded value $G_f$ will be the smallest of the two values $G_0$ and $G_r$.

For a convex contour, it will be the greatest of these two values.

Figures 8A, 8B, 8C:
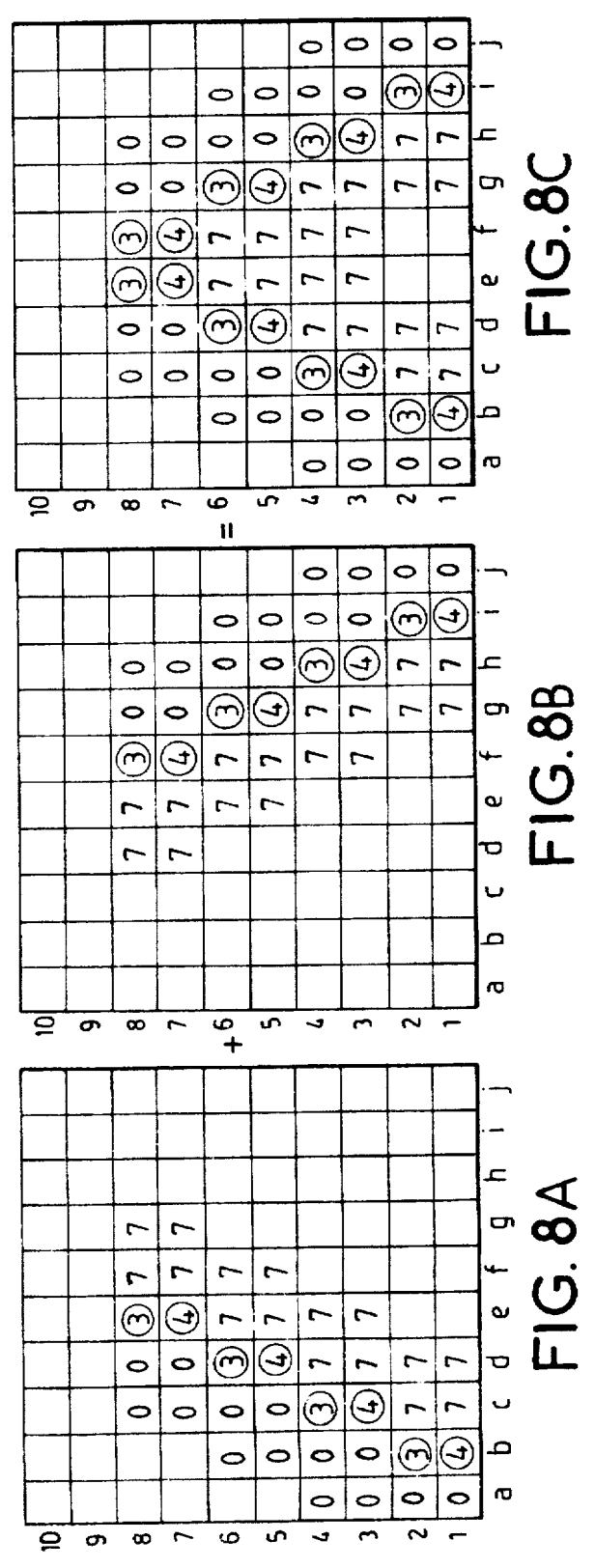

FIGS. 8 and 9 illustrate what has just been explained for two portions, one concave (FIG. 8) and the other convex (FIG. 9).

These figures show a part of the pixels of a screen and the values recorded, for example, on three bits (0 to 7) in the corresponding memory cells. In order to enable the designation of the location of these cells, the columns have been referenced a to j and the lines 1 to 10.

The contours shown (FIGS. 8 and 9) are identical. Only the position of the surface surrounded by this contour differs. FIGS. $8_1$ and $9_1$ located to the left of FIGS. 8 and 9 respectively show a first part of the contour. FIGS. $8_2$ and $9_2$ located at the, center show a second part of the contour. For each of these parts, the row of pixels closest to the normal to the contours is horizontal. The result thereof is that for each pixel belonging to the median line of the contour, the neighboring pixels that define the neighborhood of the contour are formed by four pixels of the same line, two to the right of the median line and two to the left. In order to identify the pixels of the median line, the values $G_0$ recorded in the memory slots corresponding to these pixels have been encircled. If it is assumed that the plotting of the contour began with the plotting shown in FIG. $8_1$ or $9_1$ and was then extended by the plotting shown in FIG. $8_2$ or $9_2$, it is seen for example that four pixels of the line 8 (d8 to g8) are common to two portions of a plotted feature.

The values already recorded for the pixels d8 to g8 are seen in the cells d8 to g8 of FIG. $8_1$ or $9_1$. The values that would have to be recorded for the second part of the contour shown (in FIG. $8_2$ or $9_2$) are seen in these same cells d8 to g8 of FIG. $8_2$. During the plotting of this second part, the presence of a prior writing in the cells d8 to g8 shall be detected by the methodical reading of the cells belonging to the contour of this second part of a contour. In the case of a concave contour as shown in FIG. 8, the final value $G_f$ will be the smaller of the two values, namely $G_c$, the computed value seen in FIG. $8_2$ or $G_r$, the re-read value shown in FIG. $8_1$.

$$G_f = \min(G_c, G_r) \quad (1)$$

which leads to the final plotting shown in FIG. $8_3$ where the cell d8 for example is loaded with the value 0 shown in FIG. $8_1$ for this slot, a value smaller than the value 7 computed for this same cell for the second part of the contour.

In the case of a convex contour, the final value $G_f$ recorded is the greatest of the values $G_c$ or $G_r$. This leads, for example, for the cell d8, to the value $G_f=7$ (FIG. $9_3$) coming from FIG. $9_1$, a value greater than the value 0 which would result from the second part of the plotting shown in FIG. d8 FIG. $9_2$.

When this contour is alternatively concave and then convex or the reverse, the changing of the information on curvature is done in the zone where the curvature gets cancelled.

At the re-reading of the image memory for display on the screen, the redetection of the contour is done as follows:

each line of the memory is re-read from left to right;

the information for the automatic filling of the surfaces located within the contours is reinitialized in the inactive state for each start of a line;

each rising G type sequence indicates an entry into the surface whose contour is the contour read. The automatic filling, according to the color expected for the surface surrounded by this contour, of the part of the line located to the right of this sequence is triggered;

each descending G type sequence indicates an exit from the surface. The automatic filling of the part of the line located to the right of this sequence is interrupted. All the other sequences indicate a grazing of the surface, without any affect on the filling.

FIGS. 10 and 11 show how the sequences of values of G are interpreted when reading for the plotting of the image of the screen for the two cases dealt with in FIGS. 8 and 9.

These figures represent the same part of the screen as those shown in FIGS. $8_3$ and $9_3$. The cells having the same location are referenced by the same coordinates. For the line 8 of FIG. 8.3 for example, the sequence encountered which is 0 0 3 3 0 0 is interpreted as $G_{min}\ G_{min}\ G_{max}\ G_{max}\ G_{min}\ G_{min}$

This entails a grazing of the contour and not a crossing of the contour. It will be recalled that with the conventions adopted, a crossing is expressed by an intermediate value $G_0$ between two values, on the one hand a value $G_{min}$ and on the other hand a value $G_{max}$, the first value $G_{min}$ being preceded by or followed by a value equal to or smaller than this value $G_{min}$ and the first value $G_{max}$ being followed by or preceded by a value $G_{max}$ equal to or greater than the first value. An entry into a surface takes the form:

$G_{min}\ G_{min}\ G_0\ G_{max}\ G_{max}$ and an exit takes the form:

$G_{max}\ G_{max}\ G_0\ G_{min}\ G_{min}$

The variable G will therefore continue to rise from the outside of the contour or a filar plotted feature to the inside and, in the opposite case, it will descend, the rise or descent possibly being zero for groups of values preceding or following the intermediate value assigned to the contour crossing pixel. In FIGS. 8 to 10, the values of G for the pixels neighboring the contour crossing pixel are 0 or 7. This is a special case. The transition could also be more gradual with monotonically rising or descending values. The other lines of FIGS. 10 and 11 shall not be described in greater detail. The result of the interpretation of the sequences of values of the variable G is indicated at the head of each line.

An exemplary encoding according to the particular embodiment of the invention shall now be described with reference to FIG. 12.

In the case of the digital generation of color symbols, it has been found that a good cost/efficiency compromise could be obtained by using 16 bits per pixel in image memory. It is preferable, as a general rule, to use a number of bits that is a multiple of 8 for reasons of standardization of components.

With 16 bits, in using the invention, 11 bits are available to record the color of the filar plotted features on the screen parts where the filar plotted feature alone is present.

The code resulting therefrom is shown in FIG. $12_1$. It has the two identification bits, these two bits having the value combination 00. Three bits are reserved for the recording of the transition value G and 11 for indicating the colorimetry at a rate of 4 bits for the red and the green and 3 bits for the blue.

For the points of the screen where the filar plotted feature comes into an intersection with the previously plotted contour, the process is more complicated. The re-reading of the image memory before writing enables the detection of this type of configuration.

In this case, before any writing, it is necessary to locally compress the information pertaining to the contour or the filar plotted feature detected beneath the current filar plotted feature. This compression is done on the two pixels located to the right and left of the pixel being written on. These pixels are read in order to detect and restore any contour crossing information. As seen further above, the detection mechanism uses the sequences having a value of G or the reading of the contour crossing information on the dedicated bits as explained further below and as shall be explained again further below for this exemplary embodiment. The identification code 10 (FIG. 12-3) is then assigned to these pixels to indicate that the contour crossing information has already been extracted and the crossing bit is activated for the pixel for which a crossing information if any is detected. Hence, as a general rule for a filar plotted feature, the code 00 is used. In the particular example where the crossing of a contour is detected precisely at the pixel of the current filar plotted feature, the combination 11 (FIG. 12-4) of the identification bits makes it possible to memorize this contour crossing information at the cost of a loss of precision on the color of the plotted feature. It must be noted that this deterioration is extremely local and has no repercussions on the overall image quality.

The identification code 01 (FIG. 12-2) is assigned to the pixels of a contour which are not common or neighbors of pixels also belonging to another previously plotted contour. The code furthermore comprises the two identification bits at the value 01, three bits assigned to the transition variable G, three bits to identify the number of the current contour. It is this contour number that will enable the graphic reading processor to search for the colored code assigned to this contour. The eight remaining bits are the contour crossing bits. This number is equal to $2^3$. It is equal to the number of combinations that can be made on the bits identifying the contour number. It is clearly preferable that the number of crossing bits should be equal to $2^n$, representing the number of bits assigned to the identification of the contour number for, as in the case of 16 bits, there is then an optimum use of all the bits. It will be observed however that other configurations could be considered. Thus if the entire code were to be set up on 24 bits with two case identification bits, three bits for the variable G and four bits for the contour number, there remain 15 bits for the contour crossing bits, giving $2^4$ plus or minus 1. There is an efficient use of all the bits in this case. On the contrary, in the case 00 with two identification bits, 3 bits for the variable G, there remain 19 bits for the color, which is generally overabundant. This is why, in this preferred embodiment, the operation is done on 16 bits. This enables the processing to be done efficiently with eight contours. Should the image have more contours, the 16-bit code is still usable if it is possible to divide the image into bands parallel to the scanning lines, for example horizontal bands, each band having a maximum of only eight contours. A simple counting of the lines then enables the graphic processor to process each band as an entire image.

The code 10 (FIG. 12-3) is identical to the code 01, but this code indicates that the pixels assigned to this code have already been re-read and that the crossing bits have been if necessary marked for the contours that have preceded the current plotted portion. They do not have to be re-read since the consistency of the information has possibly been destroyed during the previous recording operations.

Finally, the code 11 (FIG. 12-4) is used for the filar plotted features located at an intersection with a contour. Eight bits are the crossing bits. The color is compressed on six bits, two for the red, two for the green and two for the blue.

What is claimed is:

1. A method for encoding words of a periodically read image memory for refreshing an image formed on the screen by set of pixel with the image having surfaces $S_1, \ldots, S_2 \ldots S_p$, which stand out against an image background, each of said surfaces having a uniform color and demarcated by a contour $C_1, \ldots, C_2 \ldots, C_p$, each contour including a median line joining the pixels located at the boundary of at least two surfaces or of a surface and a background, and a neighborhood of the median line including, on either side of the median line, at least the pixels that immediately neighbor a pixel of the median line, said image containing filar plotted features with one pixel of the screen being in a one-to-one correspondence with a memory cell which contains a word and the reading of the current cell constituting at least a part of the information required for writing the corresponding pixel on the screen, said method comprising the steps of:

erasing the image memory after each reading;

assigning an order of priority first to the contours and second to the filar plotted features;

recording the contours and subsequently recording the filar plotted features wherein, for each of the said types of plotted features, the feature with the highest priority is recorded last and wherein the memory words re-coded in relation to the contours include not only the memory words related to the median lines of the contours but also memory words related to the neighborhood of each contour and wherein a code of each re-coded memory word includes two information bits to identify the circumstances of writing of the re-coded bits, said two bits enabling the identification, by the combinations of their different possible values, of four cases;

a first case, identified by a first combination of values of the two bits, identifying a filar plotted feature which, for the pixels shown, is not on the plotted feature of a previously written contour;

a second case, identified by a second combination of the values of the two bits, identifying a contour plotting which, for the pixels shown, is not on the plotting of another contour;

a third case, identified by a third combination of the values of the two bits, identifying a contour plotting which, for the pixels shown, is in the neighborhood of a previous contour;

a fourth case, identified by a fourth combination of the values of the two bits, identifying a filar plotting feature which, for the pixels shown, is common to a previously plotted contour.

2. A method according to claim 1 wherein said screen has pixels located in lines and columns, and scanning for the plotting of the screen is done line by line, wherein the pixels of the neighborhood are constituted by a constant number of pixels located on a line or a column of pixels comprising the pixel of the median line of the contour, the pixels of the neighborhood being on a line when the normal to the plotted feature at the pixel of the median line is angularly closer to the direction defined by the columns and, if not, on a column, the number of pixels of the neighborhood being equal on either side of the median line.

3. A method according to claim 2, wherein the code of each re-coded memory word includes, for the first three cases, a group of bits designed for the recording of a variable G, the value of this variable G rising in the scanning direction from the exterior of the contour or of the filar plotted feature to the interior and descending in the opposite case.

4. A method according to claim 3, wherein the variable G represents a ratio between the color value inside the contour or the filar plotted feature and the color value located outside the contour.

5. A method according to claim 4 wherein, for the second, third and fourth cases, a group of bits comprising a number of bits equal to the number of contours envisaged for the image of the screen is reserved for a recording of a contour crossing, this crossing being identified by a value assigned to a bit of the group, each bit of the group being itself in a one-to-one correspondence with one of the contours.

6. A method according to claim 4 wherein, for the second and third cases, a group of bits is designed for the recording of a contour number.

7. A method according to claim 3 wherein, for the second, third and fourth cases, a group of bits comprising a number of bits equal to the number of contours envisaged for the image of the screen is reserved for a recording of a contour crossing, this crossing being identified by a value assigned to a bit of the group, each bit of the group being itself in a one-to-one correspondence with one of the contours.

8. A method according to claim 3 wherein, for the second and third cases, a group of bits is designed for the recording of a contour number.

9. A method according to claim 3 wherein, for the first case, the code includes, in addition to the two case identification bits and the group of bits indicating the value of the variable, only one other group of bits indicating a color value.

10. A method according to claim 2 wherein, for the second, third and fourth cases, a group of bits including a number of bits equal to the number of contours envisaged for the image of the screen is reserved for a recording of a contour crossing, this crossing being identified by a value assigned to a bit of the group, each bit of the group being itself in a one-to-one correspondence with one of the contours.

11. A method according to claim 2 wherein, for the second and third cases, a group of bits is designed for the recording of a contour number.

12. A method according to claim 1, wherein the code of each re-coded memory word includes, for the first three cases, a group of bits designed for the recording of a variable G representing a ration between the color value within the contour or of the filar plotted feature and the color value located on the exterior.

13. A method according to claim 12 wherein, for the first case, the code includes, in addition to the two case identification bits and the group of bits indicating the value of the variable G, only one other group of bits indicating a color value.

14. A method according to claim 12 wherein, for the second, third and fourth cases, a group of bits including a number of bits equal to the number of contours envisaged for the image of the screen is reserved for a recording of a contour crossing, this crossing being identified by a value assigned to a bit of the group, each bit of the group being itself in a one-to-one correspondence with one of the contours.

15. A method according to claim 12 wherein, for the second and third cases, a group of bits is designed for the recording of a contour number.

16. A method according claim 1 wherein, for the second, third and fourth cases, a group of bits including a number of bits equal to the number of contours envisaged for the image of the screen is reserved for a recording of a contour crossing, this crossing being identified by a value assigned to a bit of the group, each bit of the group being itself in a one-to-one correspondence with one of the contours.

17. A method according to claim 6 wherein, for the second and third cases, the number of the bits dedicated to a contour crossing recording is equal to $2^n$, n designating the number of bits designed for the recording of a contour number.

18. A method according to claim 16 wherein, for the fourth case, the code includes, in addition to the two case identification bits and the group of contour crossing bits, only one other group of bits indicating a color value.

19. A method according to claim 1 wherein, for the second and third cases, a group of bits is designed for the recording of a contour number.

20. A method according to claim 1 wherein, for the fourth case, the code includes, in addition to the two case identification bits and the group of contour crossing bits, only one other group of bits indicating a color value.

* * * * *